US010357712B2

(12) United States Patent
Szmaj

(10) Patent No.: US 10,357,712 B2
(45) Date of Patent: Jul. 23, 2019

(54) COMPUTER GAME CONTROLLER

(71) Applicant: Jacek Szmaj, Wroclaw (PL)

(72) Inventor: Jacek Szmaj, Wroclaw (PL)

( * ) Notice: Subject to any disclaimer, the term of this patent is extended or adjusted under 35 U.S.C. 154(b) by 0 days.

(21) Appl. No.: 15/578,458

(22) PCT Filed: Jun. 2, 2016

(86) PCT No.: PCT/PL2016/050025
§ 371 (c)(1),
(2) Date: Nov. 30, 2017

(87) PCT Pub. No.: WO2016/195519
PCT Pub. Date: Dec. 8, 2016

(65) Prior Publication Data

US 2018/0169519 A1 Jun. 21, 2018

(30) Foreign Application Priority Data

Jun. 3, 2015 (PL) ........................................ 412569

(51) Int. Cl.
*A63F 13/22* (2014.01)
*A63F 13/24* (2014.01)
*A63F 13/822* (2014.01)

(52) U.S. Cl.
CPC .............. *A63F 13/24* (2014.09); *A63F 13/22* (2014.09); *A63F 13/822* (2014.09); *A63F 2300/8076* (2013.01)

(58) Field of Classification Search
CPC ................................................ A63F 13/22–25
See application file for complete search history.

(56) References Cited

FOREIGN PATENT DOCUMENTS

| | | | |
|---|---|---|---|
| GB | 2450103 | A | 12/2008 |
| WO | 02/01589 | | 1/2002 |

OTHER PUBLICATIONS

International Search Report and Written Opinion for PCT/PL2016/050025, dated Sep. 28, 2016.

*Primary Examiner* — Omkar A Deodhar
(74) *Attorney, Agent, or Firm* — Arrigo, Lee, Guttman & Mouta-Bellum LLP

(57) ABSTRACT

The subject of the invention is a computer game controller, comprising a base (1) placed on a fixed substrate, with a chassis (2) placed thereupon, of ergonomic shape adapted for resting the user's hand, with a number of function buttons (3) on the top surface, the function buttons (3) enabling programming their functions, the base (1) being connected with the chassis (2) by means of a sliding lever mechanism (4), situated substantially axially along the longitudinal axis of the base (1), providing tilting the chassis (2) relative to the base (1) in two opposite directions, and a sliding movement of the chassis (2) forward and rearward in relation to the base (1), and at least one front switch (5) and a corresponding front resistive element (6), at least one rear switch (5) and a corresponding rear resistive element (6), at least one left-side switch (5) and a corresponding left-side resistive element (6), and at least one right-side switch (5) and a corresponding right-side resistive element (6) so that during the sliding forward movement, the front resistive element (6) presses the front switch (5), during the sliding backward movement, the rear resistive element (6) presses the rear switch (5), on the left tilt, the left-side resistive element (6) presses the left-side switch (5), and during the right tilt, the right-side resistive element (6) presses the right-side switch (5).

17 Claims, 6 Drawing Sheets

Figure 1:
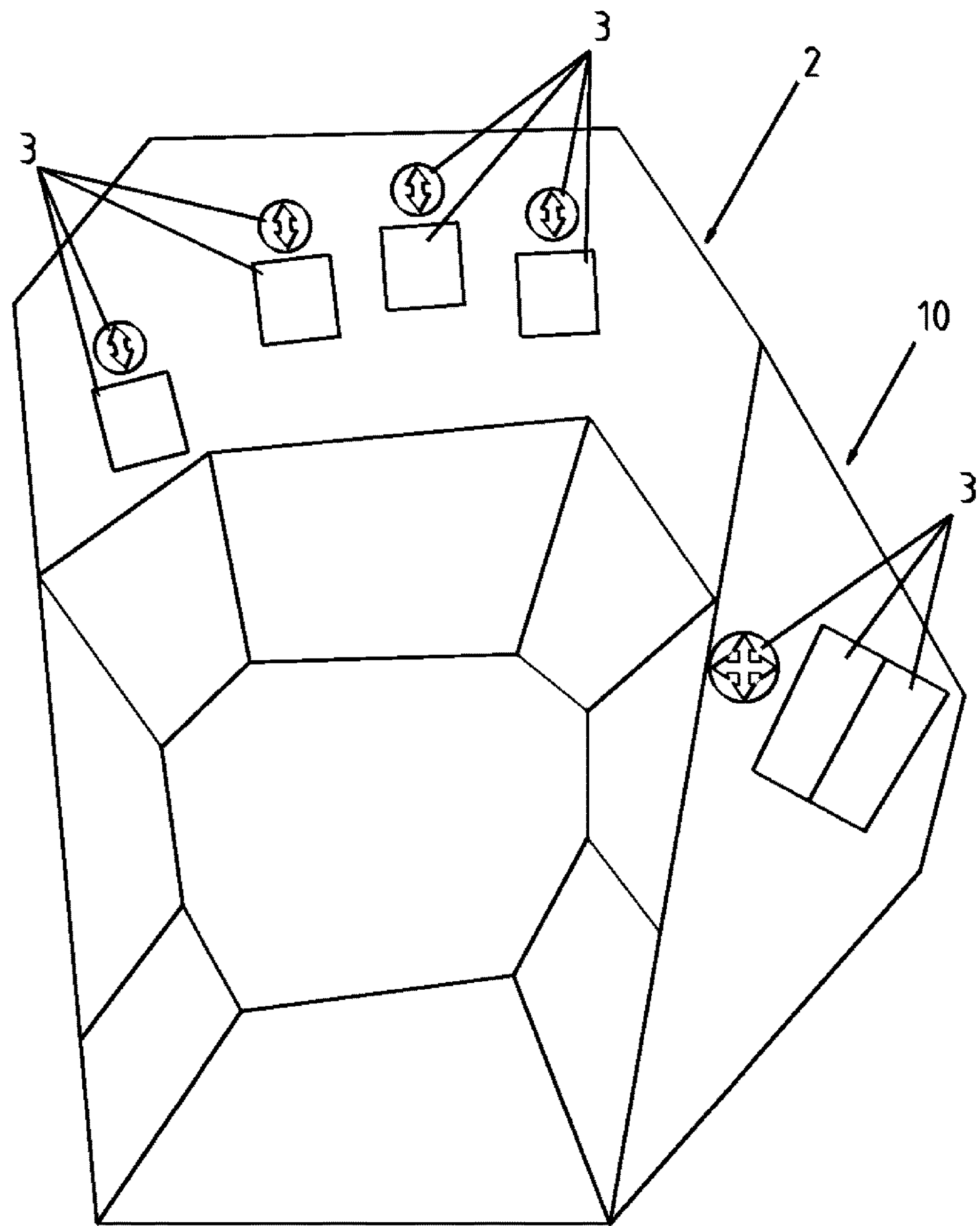

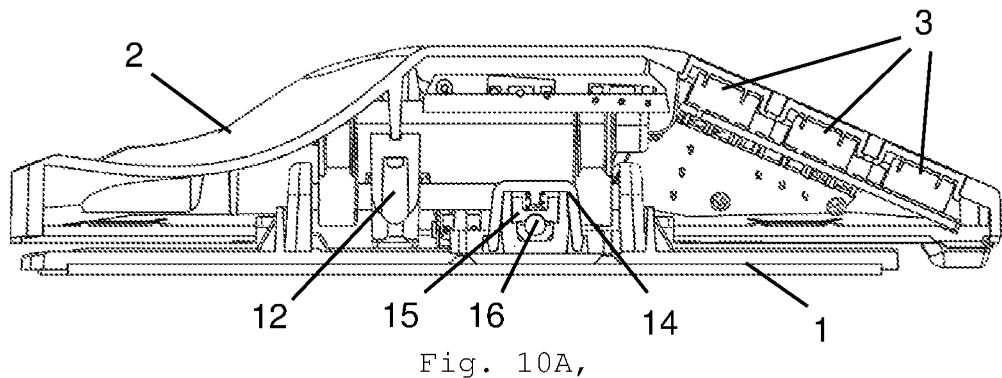
Fig. 10A,
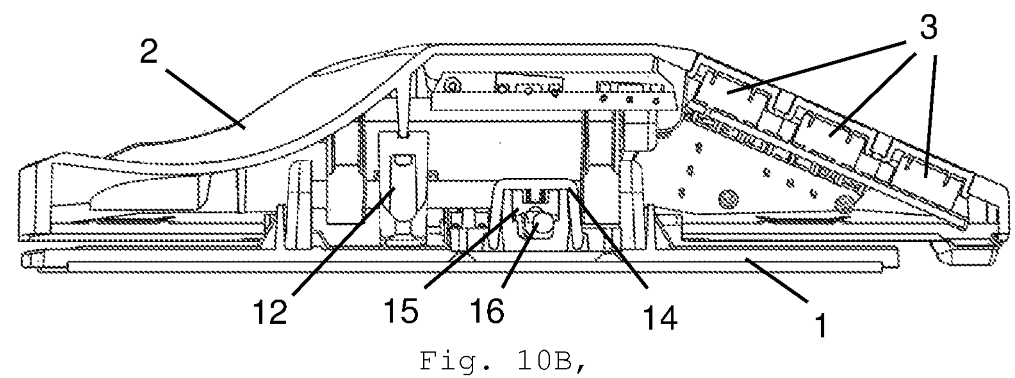
Fig. 10B,
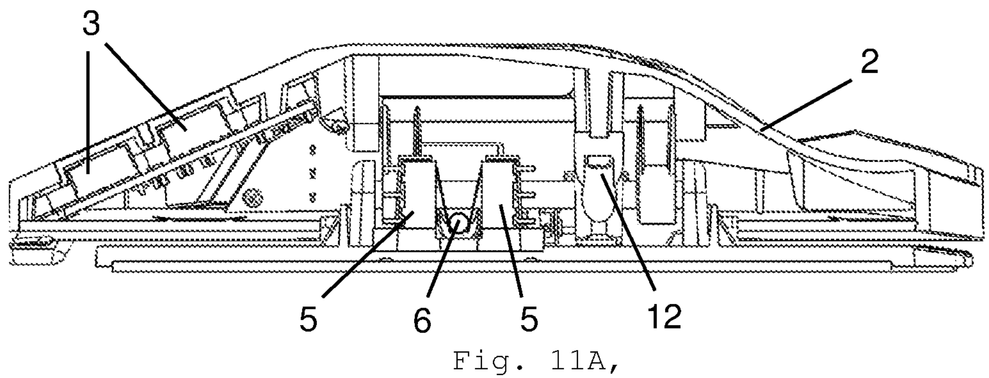
Fig. 11A,
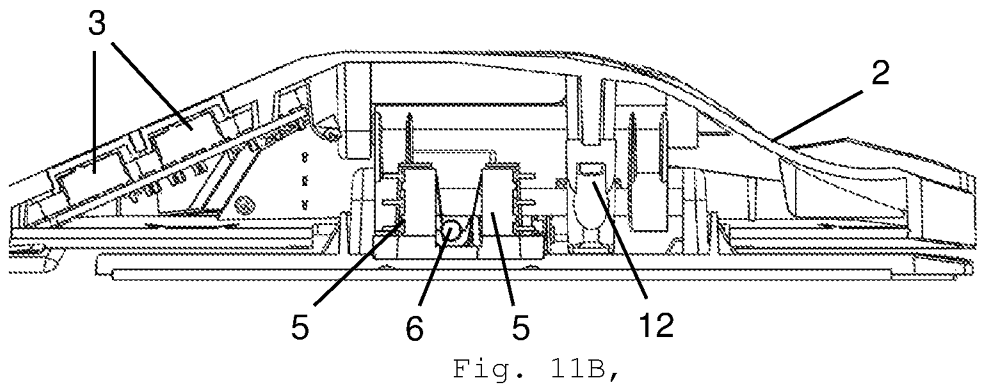
Fig. 11B,

COMPUTER GAME CONTROLLER

The subject of the invention is a computer game controller, connected to a video game console or a computer, intended for use in games, and in particular for controlling a video game character movement or actions, especially in FPP, FPS, and RPG type game.

FPP (First Person Perspective), FPS (First Person Shooter), or RPG (Role-Playing Game) type computer games, consisting in particular controlling a character in the video game, e.g. motion, rotation, action, require, in many cases, using a plurality of peripheral equipment. In particular, in case of games run on personal computers, full game character control requires using the computer keyboard and the mouse at the same time. Typically, the game character movement is provided by the computer keyboard, where using the keys corresponding to letters W, A, S, D, the character movement is achieved, respectively, forward, to the left, backward, and to the right Using the computer mouse, in turn, the character's equipment use is achieved, e.g. aiming and shooting with the weapon for FPS games. Present computer games, in order to obtain the full playability, require simultaneous operation of these peripheral devices with both hands. The ever increasing functionality of the games, requiring using a number of additional keys to operate additional options of the played character, results, on the one hand, in the necessity to perform uncomfortable and difficult finger movements on the keyboard (these keys are usually located around the ones responsible for the character movement), and translates into the player's slowed response on the other. Furthermore, prolonged keyboard operation results more and more often in wrists disorders, particularly the carpal tunnel syndrome.

Taking into account the specific control requirements of FPP, FPS, or RPG type computer games, a number of computer games controllers have been developed, which allow to replace the computer keyboard and/or the computer mouse. The most important from the point of view of ergonomics and possibility to operate a computer game is the replacement of a part of the control connected with the computer keyboard, in particular the character movement by means of W, A, S, D buttons.

From international patent application No. WO2009005500A1, a game controller is known, equipped among others with a clickable trackball. The device has the game controller form found with video games consoles, operated with both hands, thus replacing both the computer keyboard and the computer mouse. The trackball in the presented game controller can be operated from the top of the controller, i.e. with the thumb, and from the bottom of the controller, i.e. with other fingers. Rotating the trackball in the given direction causes the character movement in the same direction, which has replaced the classic solution known computer keyboards, and consisting in using the W, A, S, D keys. The trackball can be also pressed, which provides an increased functionality of the game controller. The presented solution is less accurate that the computer keyboard and mouse set, and relatively complex in operation. In particular, replacing the computer mouse with an analogue joystick does not allow for as quick player's response as provided by the computer mouse. Furthermore, the presented game controller must be kept in hands during use, does not provide palm support, which can cause fatigue on prolonged use.

There are commercially available game controllers in the form of additional keyboards, facilitating operation of computer games. Examples of such devices are Logitech G13, or Belkin N52te. These devices are in principle an ergonomic rest for the hand, with a number of programmable buttons. This allows to program the appropriate buttons and simulate the buttons of a classic computer keyboard, e.g., A, S, D. The appropriate shape of the said controllers matches the hand and provides full ergonomics, preventing fatigue or wrist ailments. Game controllers are used independently of the computer mouse and replace only a part of control provided by the computer keyboard. Location of the buttons in these controllers is consistent with the location of the keys on the keyboard, which makes the access to them all more difficult and requires high movement precision. Thus the player's response time becomes longer since it requires appropriate positioning of the hand.

US patent application US2012299829A1 discloses, in turn, a computer input device configured to accept a user's hand palm down. It comprises a handle affixed on top of a stick, which in turn is secured to a base. The stick can be moved by the handle in a plurality of axes, thus providing appropriate input signals for the receiver. The top has a number of buttons arranged in different planes that various functions can be programmed to. The device is usually used in combination with the computer mouse. The presented input device it is designed to replace the computer keyboard in various types of computer games, Where e.g. movement of the game character was carried out using the W, A, S, D buttons. A number of buttons arranged upon the handle allows to program the other function keys from the computer keyboard. Replacing the W, A, S, D buttons from the computer keyboard with the movement of the stick with a handle affixed on a top of it does not provide the same accuracy of movement. Furthermore, using the said game controller, one hand must rest on the handle having a certain height, which prevents resting the forearm on a stable base, forcing higher loads imposed on the joints of the given hand, in particular the wrist and elbow joints.

The technical problem faced by this invention is to propose such game controller that will be a "plug and play" type device, will replace the computer keyboard in the operation of a character in a computer game, and will in particular replace the W, A, S, D buttons providing the operation of a character in a computer game, will have a number of additional, programmable buttons allowing to assign additional function keys from the computer keyboard, and will be a stable, ergonomic structure, upon which the user's hand may rest freely without exerting a negative influence upon the hand joints, a will provide increased accuracy of operation at the same time. Unexpectedly, the said technical problems have been solved by the present invention.

The subject of the invention is a computer game controller, comprising a base placed on a fixed substrate, having a chassis placed on the said base, with a number of function buttons on the top side, and an ergonomic shape, adjusted for resting the user's hand upon it, and the function buttons enable programming their functions, characterized in that the base is connected with the chassis by means of a sliding lever mechanism, arranged substantially axially along the longitudinal axis of the base, providing tilting the chassis relative to the base in two opposite directions and sliding movement forward and rearward in relation to the base, and at least one front switch and a corresponding front resistive element, at least one rear switch and a corresponding rear resistive element, at least one left-side switch and a corresponding left-side resistive element, and at least one right-side switch and a corresponding right-side resistive element so that during the forward sliding movement, the front resistive element presses the front switch, that during the backward sliding movement, the rear resistive element presses the rear switch, during the left tilt, the left resistive element presses the left switch, and during the right tilt, the right resistive element presses the right switch. In a favorable embodiment of the invention, the front switch and/or the rear switch are located on the base, and the corresponding front resistive element and/or the rear resistive element, respectively, are situated on the interior surface of the chassis. In another favorable embodiment of the invention, the front switch and/or the rear switch are located on the internal surface of the chassis, and the corresponding front resistive element and/or the rear resistive element, respectively, are situated on the base. In another favorable embodiment of the invention, the left switch and/or the right switch are located on the internal surface of the chassis, and the corresponding left resistive element and/or the right resistive element, respectively, are situated on the base. Favorably, the left switch and/or the right switch are located on the base, and the corresponding left resistive element and/or the right resistive element, respectively, are situated on the interior surface of the chassis. Equally preferably, the front resistive element and the rear resistive element are connected to each other and form a common resistive element. Even more preferably, the left resistive element and the right resistive element are connected to each other and form a common resistive element. In another favorable embodiment of the present invention, the computer game controller also comprises a front spring element and/or a rear spring element. Favorably, the computer game controller also comprises a left spring element and/or a right spring element. In another favorable embodiment of the present invention, the computer game controller also comprises a first spring mechanism and/or a second spring mechanism. Favorably, the spring mechanism comprises a cam element equipped with a slot and a key inserted in the cam element slot. Equally preferably the cam element and/or key are mounted on a fixing spring. In a preferable embodiment of the present invention, the sliding lever mechanism comprises a cylindrical socket fitted on the base, which a slidable rod fitted to the internal surface of the chassis is inserted into. Preferably the sliding lever mechanism comprises a cylindrical socket fitted to the internal surface of the chassis, which a slidable rod fitted to the base is inserted into. In another preferred embodiment of the present invention, the sliding lever mechanism is divided into two sections, situated near the opposite ends of the computer game controller along its longitudinal axis. In another preferred embodiment of the invention, the chassis also comprises a lateral section with additional function keys. Preferably, the chassis has been produced in 3D printing technology. More preferably, the computer game controller comprises a wireless interface to communicate with the computer equipment.

The computer game controller according to the present invention is a "plug and play" device, requires no special software since it is reported as a computer keyboard, which makes operating it much easier. The buttons present on the chassis can be freely programmed, which allows replacing the computer keyboard completely in computer games, in particular the W, A, S, and D. Furthermore its structure is stable, placed on a flat surface, providing precision and certainty of movements. Furthermore, the ergonomic shape of the chassis, matched to the user's hand, allows for a free hand positioning, without negative influence upon the hand joints.

Figure 2:
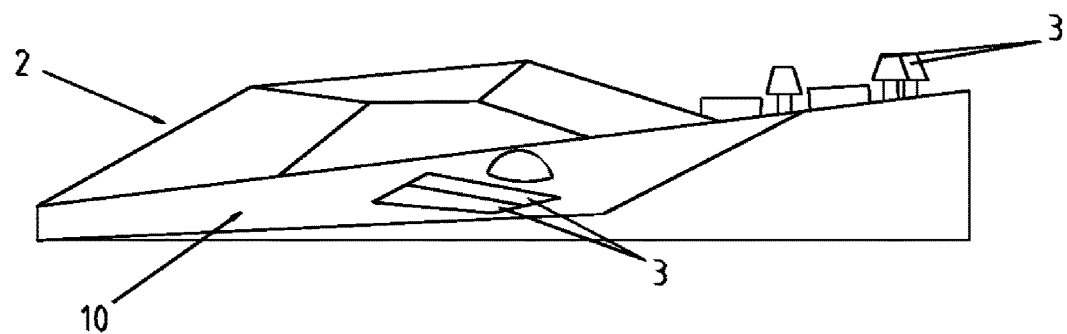
Figure 5:
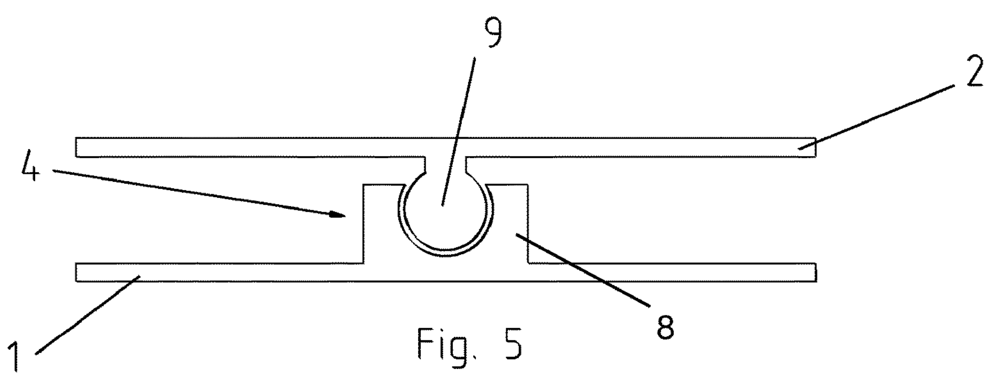
Figure 6:
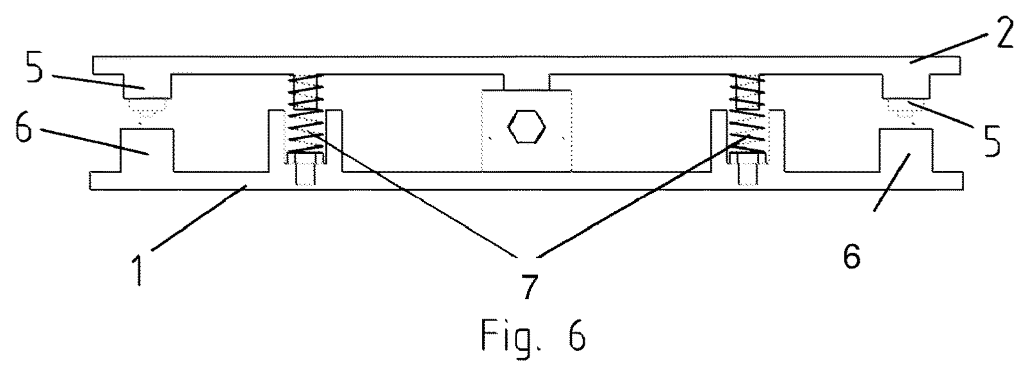
Figure 3:
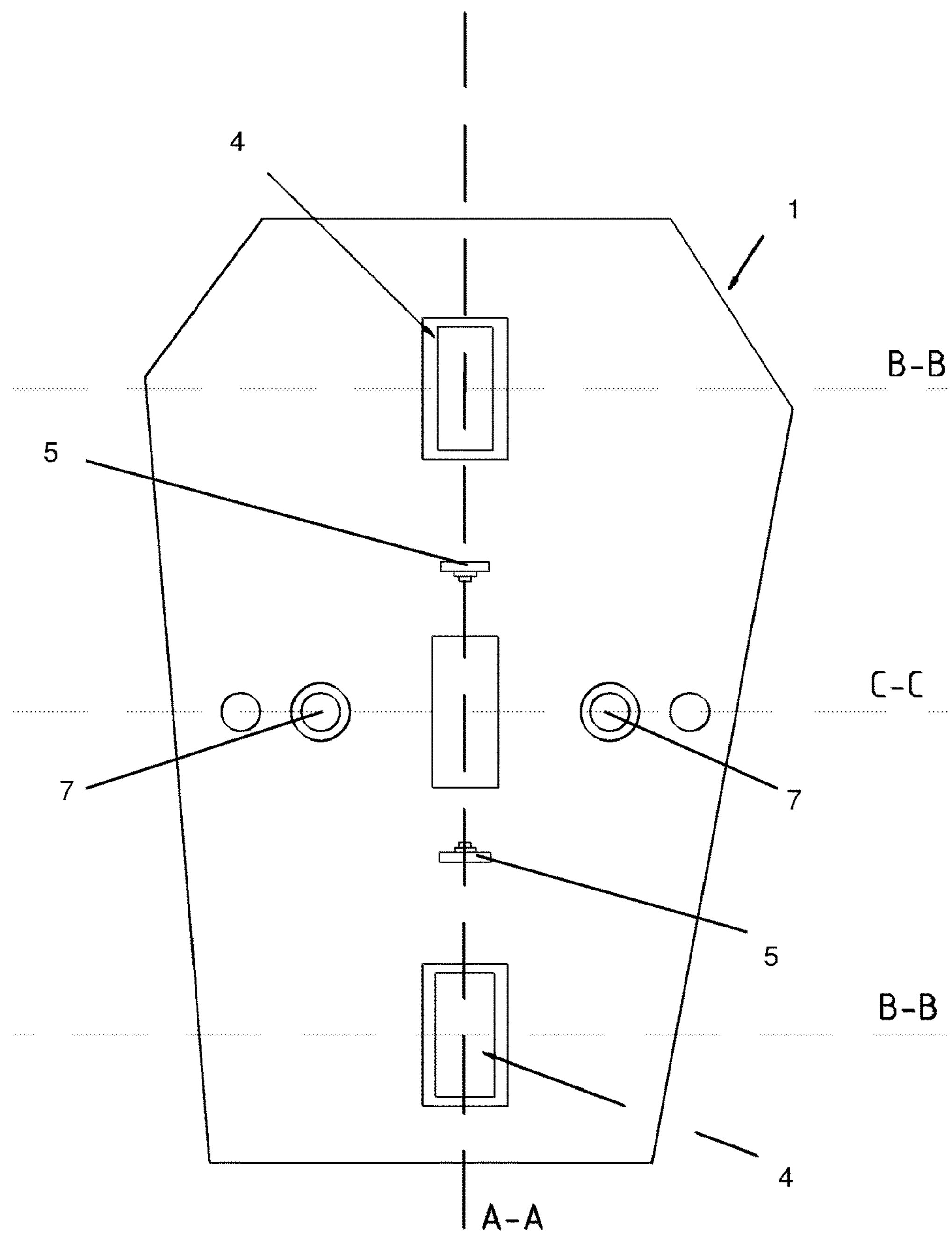
Figure 4:
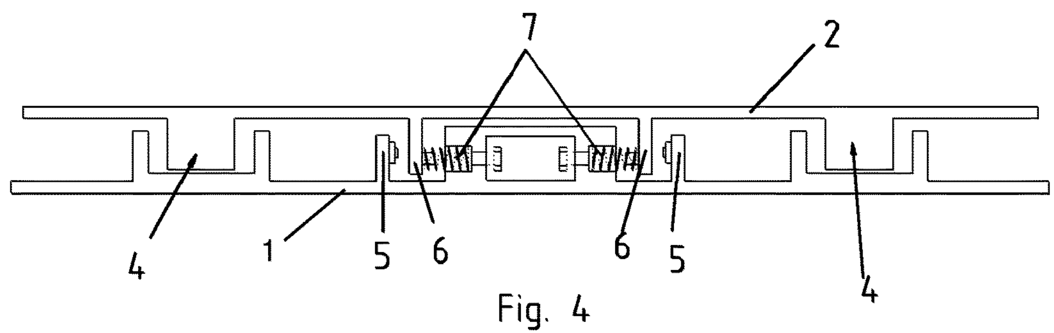
Figure 7:
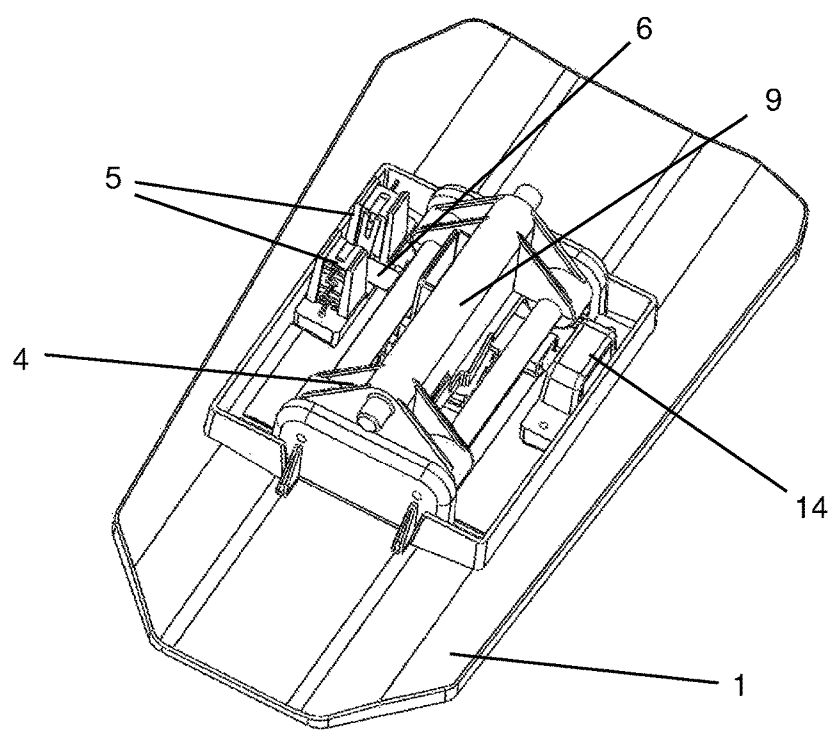
Figure 9A:
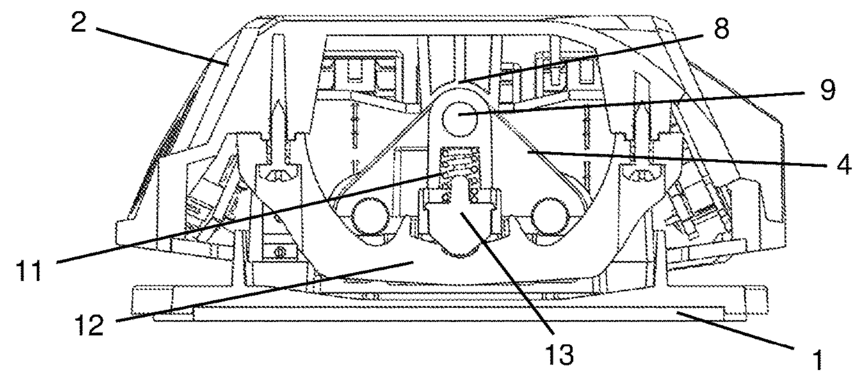
Figure 9B:
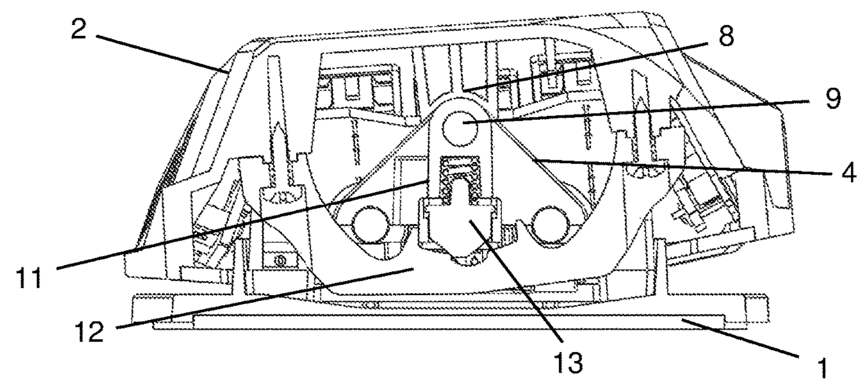

Exemplary embodiments of the invention have been presented in the drawings, wherein FIG. 1 illustrates the top view of the first embodiment of the computer game controller, FIG. 2 is illustrates lateral view of the first embodiment of the computer game controller, FIG. 3 illustrates the top view of the base of the first embodiment of the computer game controller, FIG. 4 illustrates a longitudinal cross-section of the first embodiment of the computer game controller along the A-A plane, FIG. 5 illustrates a cross-section of the first embodiment of the computer game controller along the B-B plane, FIG. 6 illustrates a cross-section of the first embodiment of the computer game controller along the C-C plane, FIG. 7 illustrates the axonometric view of the base of the second embodiment of the computer game controller, FIGS. 8A and 8B illustrate cross-sections of the second embodiment of the computer game controller in front view, in normal and in tilted to the left position, respectively, FIGS. 9A, 9B and 9B illustrate the top views of the base of the second embodiment of the computer game controller in normal, tilted to the left, and tilted to the right positions, respectively, FIGS. 10A and 10B illustrate lateral cross-section of the second embodiment of the computer game controller, in normal and in moved to the front positions, respectively, whereas FIGS. 11A and 11B illustrate a second lateral cross-section of the second embodiment of the computer game controller, in normal and in moved to the front positions, respectively,

EXAMPLE 1

The first embodiment of the computer game controller according to the invention is illustrated in FIGS. 1-6. The taks of the computer game controller is to replace, first of all, the W, A, S, and D buttons of the computer keyboard, used to move the game character in FPP games, and other function keys, situated around the said W, A, S, D keys operated with the same player's hand. The presented computer game controller assumed a shape resembling a computer mouse. In this embodiment, a computer game controller adapted to the user's left hand is described. Of course, the computer game controller may by adapted to the user's right hand without departing from the protective aspect defined in the appended claims. The chassis 2 of the computer game controller has been contoured to have an ergonomic shape, enabling free positioning of the hand. There are 8 function keys 3 arranged on the chassis surface 2, which are operated with the fingers of the palm resting on the controller. Function keys 3 are arranged so that they can be operated without the need to take away the whole hand from the computer game controller. In an alternative embodiment, there can be higher or lower number of function keys 3, depending on the requirements of the given application. The number of function keys 3 situated on the external surface of chassis 2 does not constitute a limitation to the protective scope of this invention. In the presented embodiment, the chassis 2 comprises an additional replaceable lateral section 10, as illustrated in FIG. 1, located on the right side of the main part of the chassis 2, where additional function keys 3 have been deployed, operated with the user's thumb.

The computer game controller according to the first embodiment of the present invention comprises a base 1, placed on a flat surface, such as a desk. The base 1, illustrated in FIG. 3, has an elongated shape resembling the shape of a computer mouse, wherein the longitudinal axis substantially defines the middle of the base 1. The base 1 and the chassis 2 are interconnected with a slidable lever mechanism 4 that has been divided into two sections in this embodiment of the invention, the front one situated near the front end of the game controller, and the rear one situated near the rear end of the controller. The sliding lever mechanism 4 has been situated along the longitudinal axis of the base 1 of the computer game controller. The cross-section of the control along the plane marked as B-B in FIG. 3, disclosing the structure of the sliding lever mechanism 4, has been presented in FIG. 5. Each section of the sliding lever mechanism 4 comprises a cylindrical socket 8 mounted on the base 1 which a slidable cylindrical rod 9 fitted to the internal surface of the chassis 2 is inserted into. Such design provides tilting the chassis 2 relative to the base 1 and a sliding forward and backward movement of the chassis 2 relative to the base 1. Between the sections of the sliding lever mechanism 4, a switching mechanism has been made, consisting of a front switch 5 and a corresponding front resistive element 6, a rear switch 5 and a corresponding rear resistive element 6, a left switch 5 and a corresponding left resistive element 6, and a right switch 5 and a corresponding right resistive element 6. The implemented switches 5 can be any switches suitable for that purpose, known in the state of the art, such as digital switches or analogue switches, which does not constitute a limitation of this invention. During the sliding forward movement, the front resistive element 6 presses the front switch 5, during the sliding backward movement, the rear resistive element 6 presses the rear switch 5, on the left tilt, the left resistive element 6 presses the left switch 5, and during the right tilt, the right resistive element 6 presses the right switch 5. Such action of the controller provides the game character movement, replacing the classically used W, A, S, and D buttons of the computer keyboard. The left and the right switches 5 are situated on the internal surface of the chassis 2, and their corresponding resistive elements 6 are situated on the base 1. The front and the rear switches 5 are placed on a special supporting structure on the base 1, whereas their corresponding resistive elements 6 are situated on the internal surface of the chassis 2. The computer game controller has also been equipped with a left and a right spring element 7, situated close to the first and the second switch 5, which provide the return movement of the chassis 2 after the tilt to the left or to the right. Similarly, the spring elements 7 are provided for tilting the chassis 2 to the front and to the back, the spring elements 7 using common resistive elements 6 for the front and the rear switch 5. Similarly, spring elements 7 have been used in order to provide the return movement for tilting chassis forwards and backwards in relation to the base 1.

The computer game controller according to the present invention comprises also an electronic system that the function keys 3 and witches 5 are connected to in order to operate and send corresponding electric signals to the computer hardware that the said computer game controller is connected to. This way, the said computer game controller is a "plug and play" device that upon connection to the computer hardware reports as a computer keyboard. The connection to the computer hardware is provided in a wireless way, by means of Bluetooth standard.

Example 2

A computer game controller according to the second embodiment of the present invention is schematically illustrated in figures from 7 to 11. Particularly, the design and the principle of operation of the controller is convergent with that represented in Example 1. The computer game controller comprises a base 1 placed on a flat substrate. A sliding lever mechanism 4 is situated on the base, and serves as the element fixing the base 1 to the chassis 2 and providing tilting movements of the chassis 2 to the sides, and sliding movements forwards and backwards of the chassis relative to the base 1. In this embodiment of the present invention, the sliding lever mechanism comprises a single cylindrical rod 9 fitted to the base 1 and a cylindrical socket 8 situated on the internal side of the chassis surface 2, which is the best illustrated by FIGS. 8A and 8B. Analogically, there are function keys 3 arranged in the chassis, operated with the user's fingers. Additionally, there are also a front and a rear switches 5 situated on the base 1 (illustrated in the axonometric view in FIG. 7 and in lateral cross-sections in FIGS. 11A and 11B) The front and the rear switches 5 are activated by the common resistive element 6, connected with the sliding lever mechanism 4. FIG. 11A illustrates the lateral cross-section of the computer game controller in normal position, i.e. without tilting in any direction. FIG. 11B illustrates, in turn, the lateral cross-section of the computer game controller in slid forward position. On sliding the chassis 2 forward relative to the base 1, concurrent sliding forward of the resistive element 6 is observed, which results in pressing the front switch 5, and consequently, the computer game controller sends an appropriate signal to the receiver, e.g. a signal corresponding to the forward movement of the character. Similarly, on sliding the chassis 2 backwards relative to the base 1, the resistive element 6 will press the rear switch 5, resulting in sending an appropriate message to the receiver. The applied front and rear switches 5 can be any type of switches used in analogous solutions, without departing from the subject matter of this invention. In order to implement automatic return of the chassis 2 to the normal position on cessation of the shifting force in any direction, a spring mechanism 14 has been used, as presented in the axonometric view in FIG. 7 and in lateral cross-sections in FIGS. 10A and 10B. The spring mechanism 14 comprises a cam element 15 equipped with a socket and a key 16 of the shape corresponding to the said socket in the cam element 15. The cam element 15 is attached to the base by means of a suitable spring, which causes pressing the cam elements 15 towards the base 1. FIG. 10A illustrates a lateral cross-section of a second embodiment of the computer game controller in its normal position (when no force acts upon it). In this situation the key 16 the spring mechanism 14, connected with the sliding lever mechanism 4, is situated in the cam element 15 socket. FIG. 10B illustrates the computer game controller with the chassis slid forward. In this situation, an appropriate forward shift of key 16 took place, which moving outside the cam element socket 15 caused the latter to slide upwards, and in consequence pressing the fixing spring. This resulted in creation of even greater force pressing the cam element 15 towards the base 1, thus, taking into account the geometry of the key 16 and the cam element 15 socket, increasing the force forcing the return of the chassis 2 to the normal position, in particular after the cessation of the force causing its shift. The spring mechanism 14 will behave similarly on sliding the chassis 2 in the opposite direction, i.e. backwards, in relation to the base 1. The implementation of the sliding lever mechanism 4, like in example 1, additionally provided a tilting movement of the chassis 2 to the sides in relation to the base 1. This situation is best illustrated by FIG. 8A, illustrating the controller cross-section in normal position, and FIG. 8B, illustrating the controller cross-section in the chassis 2 position tilted to the left relative to the base 1. FIGS. 8A and 8B best illustrated the spring mechanism 11 providing the return to the normal position on cessation of the force tilting the chassis 2. Like for the sliding movement, the spring mechanism 11 is implemented by means of a cam element 12, equipped with a socket and a key 13. This time, the key

Figure 9C:
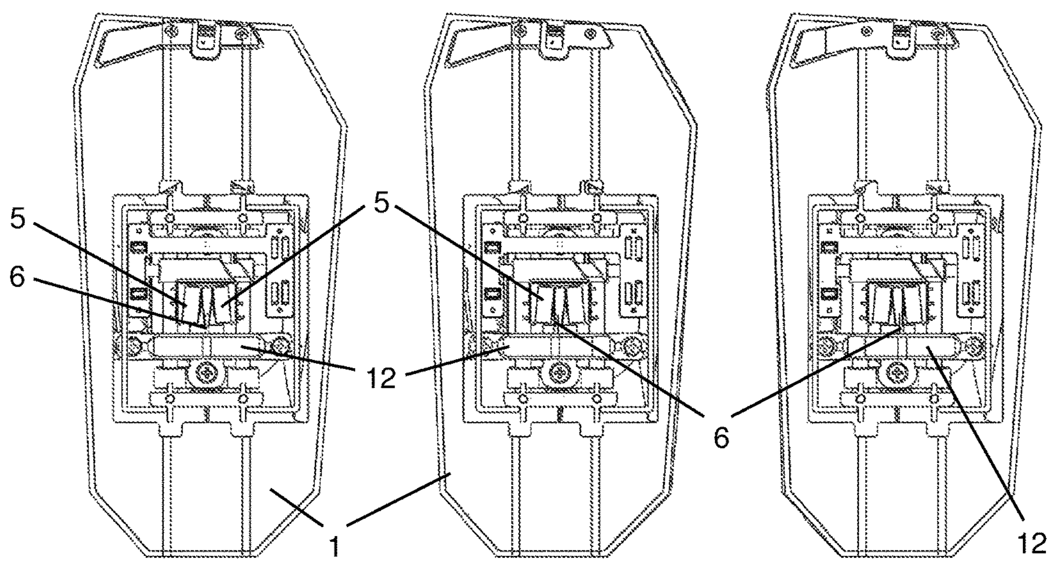

13 is seated on a spring forcing the pressure directed to the base 1. FIG. 8A illustrates the controller in normal position. In this case the key 13 rests in the socket of the cam element 12. On tilting in any direction, e.g. to the left, as illustrated in FIG. 8B, the key 13, due to being seated on a spring, moves upwards causing the cam element 12 leave the socket, causing by the same increase of the force pressing the key 13 towards the base 1, which increases the force forcing the return of chassis 2 to the normal position. After the pressing force ceases, the rounded shape of the key 13 makes it slide into the socket of the cam element 12 and in the result, the return of the cam element 12 and the whole chassis 2 to the normal position. The spring mechanism 11 implements similar operations on tilting into the other side. FIGS. 9A, 9B and 9C illustrate the top view of the base 1 (without chassis 2), respectively in normal position, tilted to the left, and tilted to the right. In the normal position, the common resistive element 6, fitted to the cam element 12, remains in central position between the respective left and right switches 5, without activating either of them. On tilting the chassis 2 to the left (FIG. 9B), the resistive element 6 is also displaced to the left, causing the activation of the left switch 5. Similarly, on tilting the chassis 2 to the right (FIG. 9C), the resistive element 6 moves to the right, causing the activation of the right switch 5. The return to the normal position is provided by the spring mechanism 11 as described above. Other structural elements of the computer game controller according to the second embodiment of the present invention, like electronic systems, connection interfaces, etc., are consistent with the elements presented in Example 1, which provides full functionality of the presented device.

The invention claimed is:

1. A computer game controller, comprising a base placed on a fixed substrate, with a chassis placed thereupon, of ergonomic shape adapted for resting the user's hand, with a number of function buttons on the top surface, the function buttons enabling programming their functions, characterized in that the base is connected with the chassis by means of a sliding lever mechanism, situated substantially axially along the longitudinal axis of the base, providing tilting the chassis relative to the base in two opposite directions, and a sliding movement of the chassis forward and rearward in relation to the base, and at least one front switch and a corresponding front resistive element, at least one rear switch and a corresponding rear resistive element, at least one left-side switch and a corresponding left-side resistive element, and at least one right-side switch and a corresponding right-side resistive element so that during the sliding forward movement, the front resistive element presses the front switch, during the sliding backward movement, the rear resistive element presses the rear switch, on tilting to the left, the left-side resistive element presses the left-side switch, and on tilting to the right, the right-side resistive element presses the right-side switch.

2. The computer game controller according to claim 1, characterized in that at least one of the front switch and the rear switch are located on the base, and at least one of the corresponding front resistive element and the corresponding rear resistive element, respectively, are situated on the interior surface of the chassis.

3. The computer game controller according to claim 1, characterized in that at least one of the front switch and the rear switch are located on the interior surface of the chassis, and at least one of the corresponding front resistive element and the corresponding rear resistive element, respectively, are situated on the base.

4. The computer game controller according to claim 1, characterized in that at least one of the left-side switch and the right-side switch are located on the interior surface of the chassis, and at least one of the corresponding left-side resistive element and the corresponding right-side resistive element, respectively, are situated on the base.

5. The Computer game controller according to claim 1, characterized in that at least one of the left-side switch and the right-side switch are located on the base, and at least one of the corresponding left-side resistive element and the corresponding right-side resistive element, respectively, are situated on the interior surface of the chassis.

6. The computer game controller according to claim 1, characterized in that the front resistive element and the rear resistive element are connected to each other and form a common resistive element.

7. The computer game controller according to claim 1, characterized in that the left-side resistive element and the right-side resistive element are connected to each other and form a common resistive element.

8. The computer game controller according to claim 1, characterized in that it additionally comprises at least one of a front spring mechanism and a rear spring mechanism.

9. The computer game controller according to claim 1, characterized in that it additionally comprises at least one of a left-side spring mechanism and a right-side spring mechanism.

10. The computer game controller according to claim 1, characterized in that it additionally comprises at least one spring mechanism.

11. The computer game controller according to claim 10, characterized in that the spring mechanism comprises a cam element equipped with a socket and a key situated in the socket of the cam element.

12. The computer game controller according to claim 11, characterized in that at least one of the cam element and the key are seated on the fixing spring.

13. The computer game controller according to claim 1, characterized in that the sliding lever mechanism comprises a cylindrical socket mounted on the base, which is a slidable cylindrical rod fitted to the internal surface of the chassis is inserted into.

14. The computer game controller according to claim 1, characterized in that the sliding lever mechanism comprises a cylindrical socket fitted to the internal surface of the chassis, which is a slidable rod fitted to the base is inserted into.

15. The computer game controller according to claim 1, characterized in that the sliding lever mechanism is divided into two sections situated near opposite ends of the computer game controller along its longitudinal axis.

16. The computer game controller according to claim 1, characterized in that the chassis additionally comprises a lateral section, where additional function keys are located.

17. The computer game controller according to claim 1, characterized in that it comprises a wireless interface for communication with computer hardware.

* * * * *